US006955235B1

(12) United States Patent
Salas (10) Patent No.: US 6,955,235 B1
(45) Date of Patent: Oct. 18, 2005

(54) TORQUE PLATFORM TRANSPORT DEVICE

(76) Inventor: Carlos Salas, 8-14 Saratoga Heights, Binghamton, NY (US) 13903

( * ) Notice: Subject to any disclaimer, the term of this patent is extended or adjusted under 35 U.S.C. 154(b) by 143 days.

(21) Appl. No.: 10/727,879

(22) Filed: Dec. 5, 2003

(51) Int. Cl.$^7$ .............................................. B62D 57/00
(52) U.S. Cl. ..................................................... 180/7.1
(58) Field of Search ........................... 74/572, 573 F, 74/84 R, 84 S; 180/7.1, 165; 244/165, 172; 440/3

(56) References Cited

U.S. PATENT DOCUMENTS

| | | | |
|---|---|---|---|
| 4,614,319 A | 9/1986 | Drexler ....................... 244/172 |
| 4,631,971 A | 12/1986 | Thornson .................... 74/84 R |
| 4,770,063 A * | 9/1988 | Mundo ....................... 74/84 S |
| 5,156,058 A * | 10/1992 | Bristow, Jr. ................. 74/84 R |
| 5,313,851 A | 5/1994 | Hull et al. ................... 74/84 R |
| 5,782,134 A | 7/1998 | Booden ...................... 74/84 R |
| 5,890,400 A | 4/1999 | Oades ......................... 74/84 S |
| 5,966,986 A | 10/1999 | Laul ............................ 74/84 R |
| 6,259,177 B1 * | 7/2001 | Deschamplain .............. 310/80 |
| 6,860,166 B2 * | 3/2005 | Hintz .......................... 74/5.47 |
| 2003/0019309 A1 * | 1/2003 | Tippett ....................... 74/5.34 |

FOREIGN PATENT DOCUMENTS

JP           02274698 A  * 11/1990  ............ B64G 1/28

* cited by examiner

Primary Examiner—Lesley D. Morris
Assistant Examiner—Daniel Yeagley
(74) Attorney, Agent, or Firm—Mark Levy & Associates (57) ABSTRACT

A vehicle transport system including a torque platform with counter-rotating flywheels, whose axes of rotation are parallel to one another, is featured. One or more torque platforms are joined together with a platform rotating mechanism to rotate the platforms relative to the vehicle in which they are mounted. The combined mechanism is used to rotate the entire vehicle. Resistance of the counter-rotating flywheels to change in their axes of rotation provides rotational torque and rotation of the entire vehicle around the vehicle's center of mass. Successive increments of rotation in alternate rotational directions are coordinated with a transfer of mass to change the center of mass of the vehicle and are used to transport the vehicle. The successive angular motions of the vehicle around its changing center of mass achieves a resultant linear motion of the vehicle in the desired direction of travel.

12 Claims, 7 Drawing Sheets

TORQUE PLATFORM TRANSPORT DEVICE

FIELD OF THE INVENTION

This invention pertains to a mechanical system that results in linear motion and transport of a vehicle in a desired direction and, more particularly, to a propulsion system suitable for the transport of a vehicle in space.

BACKGROUND OF THE INVENTION

The forces resulting in the transport of a vehicle in the environment of the surface of the earth, on roadways or over moderate terrain are most often generated by friction of driven wheels against the surface being traversed. In other environments, such as water or air, the forces are most often developed by the pulling or pushing forces generated either by propellers or the forces generated by expelling fluid material through pumps or jets in the direction opposite to the desired direction of travel of the vehicle to be moved.

In the environment of space, the first mechanism of transport, which involves the friction of driven wheels against a stationary surface, is not possible, however; there is no surface on which driven wheels can operate. The second mechanism, expelling material, most often requires the expulsion of reaction mass in the direction opposite the desired direction of travel of the vehicle, i.e., conventional rocketry.

Alternative methods of transport of a vehicle in a space environment have been explored and documented in several patents.

U.S. Pat. No. 4,614,319, issued on Sep. 30, 1986 to Kim E. Drexler for SOLAR SAIL, proposes a solar sail system for generating transport forces by intercepting light pressure, and teaches the mechanism for constructing such a system.

U.S. Pat. No. 4,631,971, issued on Dec. 30, 1986 to Brandson R. Thornson for APPARATUS FOR DEVELOPING A PROPULSION FORCE, proposes an apparatus for generating transport forces without the use of projection of material in the direction opposite the desired direction of travel. This technique teaches the use of electromagnetic restraint to provide a whip-like action inducing a resultant force in a direction perpendicular to the plane containing the axes of rotating wheels.

U.S. Pat. No. 5,313,851, issued on May 24, 1994 to Harold L. Hull et al. for REUSABLE MASS PROPULSION SYSTEM, proposes the use of rotational motion to accelerate masses in desired directions, and uses the combination of elastic members and damping members to provide momentum in the desired direction, without necessitating the opposite projection of particles.

U.S. Pat. No. 5,782,134, issued on Jul. 21, 1998 to James D. Booden for ELECTROMAGNETICALLY ACTUATED THRUST GENERATOR, proposes the use of electromagnetically operated rotatable elements to produce an imbalance in rotational forces resulting in forces in a desired direction without expulsion of reaction mass.

U.S. Pat. No. 5,890,400, issued on Apr. 6, 1999 to Ross A. Oades for APPARATUS FOR GENERATING A PROPULSION FORCE, proposes the use of movable weights mounted on a rotating flywheel, and the displacement of the weights relative to the axis of rotation of the flywheel to generate unidirectional forces providing propulsive force in a given direction without the ejection of reaction mass.

U.S. Pat. No. 5,966,986, issued on Oct. 19, 1999 to Virgil Rickard Laul for PROPULSION SYSTEM, proposes the use of the eccentric motion produced by the rotation of an unbalanced weight, together with a mechanism allowing the weights to reciprocate and transfer momentum to the combined system, resulting in motion in the desired direction without expelling matter to the external environment.

The review of prior art has disclosed the systems listed above, which share a common element in that they operate without the expulsion of reaction mass to achieve forces resulting in transport in the desired direction. None of the references teach the use of counter-rotating flywheels to construct a torque platform whose resistance to change in angular momentum can be used to rotate a vehicle in space, nor do they disclose the other inventive concepts of the present invention.

SUMMARY OF THE INVENTION

In accordance with the present invention, there is provided a torque platform on which are mounted two separate, rotationally driven flywheels, such that the flywheels are rotating in opposite directions, with their axes of rotation parallel to one another. One or more of such torque platforms are operationally joined together with a platform rotating mechanism suitable to rotate the platforms relative to the vehicle in which they are mounted. The combined mechanism is used to rotate the entire vehicle.

The resistance of the counter-rotating flywheels to change in their axes of rotation as a result of their angular momentum at their rotational speed of use is the force against which the mechanism rotating the platform provides rotational torque. This provided rotational torque results in rotation of the entire vehicle around the vehicle's center of mass. Successive increments of rotation of the vehicle in alternate rotational directions about the vehicle's center of mass are coordinated with the transfer of mass, which is used to change the center of mass of the vehicle. Such increments of rotation in alternate directions and around alternate centers of rotation are used to transport the vehicle without the use of the ejection of reaction mass. The successive angular motions of the vehicle around its changing center of mass achieves a resultant linear motion of the vehicle in the desired direction of travel.

It is an object of this invention to use the conservation of angular momentum of a system of counter-rotating flywheels mounted on a rigid planar structure, constituting a torque platform, to provide a stable platform whose resistance to change in angular momentum allows the rotation of the vehicle around its center of mass.

It is another object of the invention to use a mass transportation mechanism to move mass from one portion of the vehicle to another, thereby changing the center of mass of the vehicle.

It is another object of this invention to use successive and alternate increments of rotation of the vehicle (i.e., angular motion around the changing center of mass of the vehicle) to provide, a resultant linear motion of the vehicle in the desired direction of travel.

It is also an object of this invention to provide for the transport of a vehicle through space without the ejection of mass.

It is a further object of this invention to provide a means for the rotation of a vehicle, which for example may be a ship for traveling in or on water, a fixed wing aircraft, or a helicopter, allowing the alteration of the attitude of the vehicle without the expulsion of reaction mass or the pushing or pulling against the medium in which the vehicle is transported. This is of particular importance when the silent operation of such a vehicle is important, for instance in submarines.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention is a system and a method for providing the force to transport a vehicle through space in a desired direction, without the use of externally imposed forces, such as the pressure of sunlight or the use of expelled reaction mass, such as conventional rocketry. The present invention requires an energy source, such as solar panels or on-board fuel cells, nuclear energy, or another energy source contained in the vehicle, for the generation of electrical energy. These various energy sources are well known in the art and are not shown herein.

The energy source is used to drive motors providing the rotational force to rotate flywheels, to rotate torque platforms relative to the vehicle, and to transfer fluid mass from one reservoir to another on the vehicle.

Figure 1:
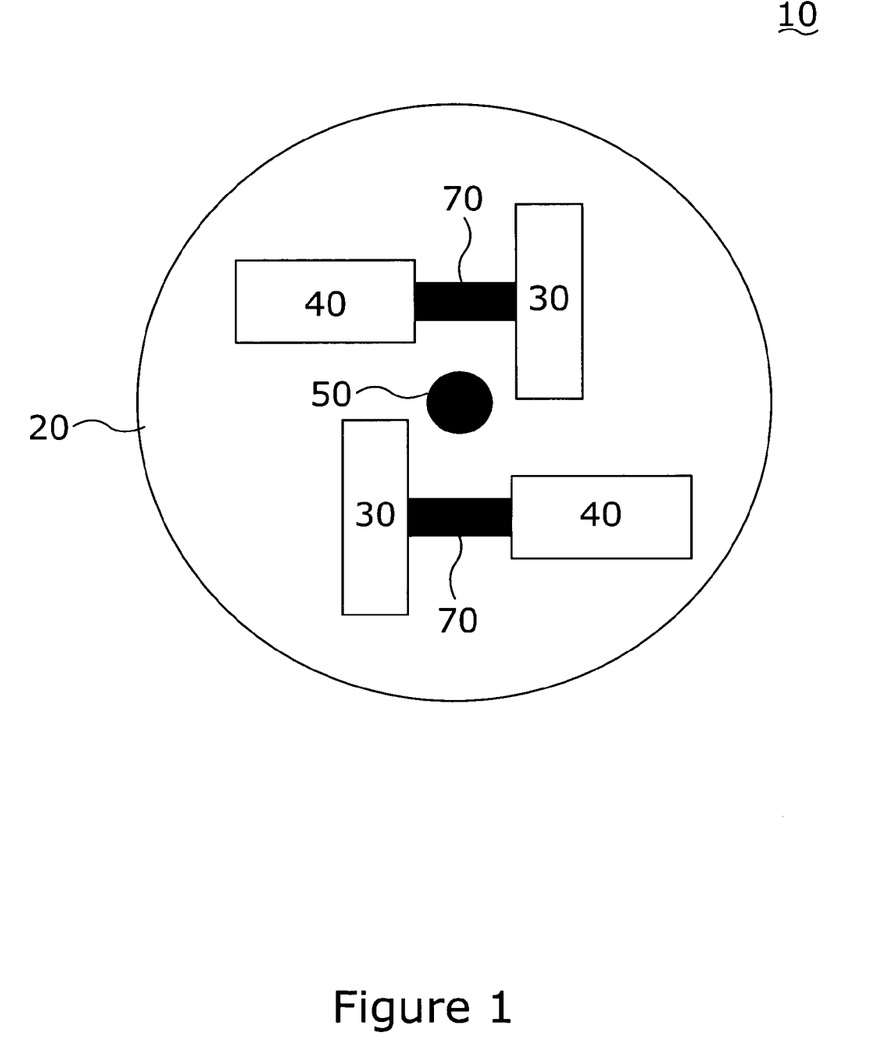
FIG. 1 is a top view of a single torque platform, consisting of a rigid platform upon which are mounted two counter-rotating flywheels driven by two motors.
Figure 3:
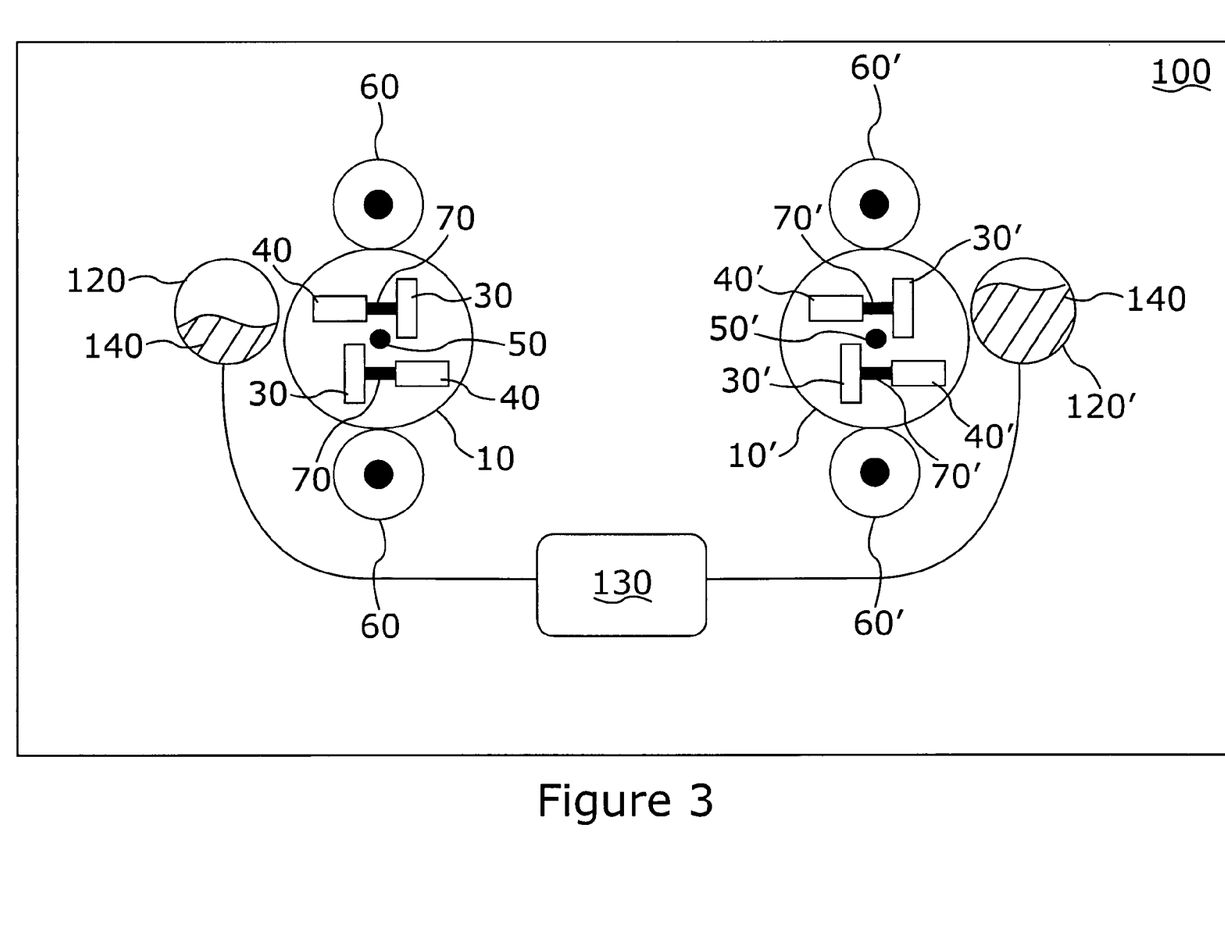
FIG. 3 is a top view of the vehicle upon which is mounted the two torque platforms and the mass transfer system, as well as two sets of two motors used to rotate each of the torque platforms.

Referring now to FIG. 1, there is shown a top view of a single torque platform 10, consisting of a rigid platform 20, upon which are mounted flywheels 30, operationally connected to flywheel driving motors 40, connected by a central axis 70, which provide rotational impetus to the flywheels 30. The rigid platform 20 is mounted to a vehicle 100 (FIG. 3) by a central bearing 50 upon which the rigid platform 20 may be rotated relative to the vehicle 100. In the embodiment shown here, a second torque platform identical to the first is mounted at a symmetrical and equidistant location on the opposite side of the vehicle (FIG. 3).

In a second embodiment (not shown) a single torque platform is moved from one end of the vehicle to the other end of the vehicle, located in each case at the center of the rotational mass by coordination with the transfer of fluid mass 140 from one reservoir 120 to the other reservoir 120'. The second torque platform 10' includes a second rigid platform 20', a second set of two counter-rotating flywheels 30', a second central bearing 50', a second set of flywheel central axes 70', and a second set of flywheel driving motors 40', all of which can be seen in FIG. 3.

The two flywheels 30 are mounted on the torque platform 10 in such a fashion that each of the central axes 70 of the flywheels 30 is parallel to one another and parallel to the plane of the torque platform 10. The two flywheels 30 are counter-rotating, and are driven rotationally by the respective flywheel driving motors 40. The flywheels 30 rotate in opposite directions, with their axes of rotation 70 parallel to one another.

As a result of this counter-rotation, the precessional torque vector of each flywheel 30, 30' counters the precessional torque vector of the other, together resisting any force that acts to change the angular momentum of the combination of the two flywheels 30, 30'. The rotation of the entire torque platform 10, 10' by the two respective platform motors 60, 60' operationally connected to the periphery of the torque platform 10, 10' (FIG. 3) is resisted by the precessional forces of the combination of the two flywheels 30, 30' and results in the rotation of the entire vehicle 100.

Figure 2:
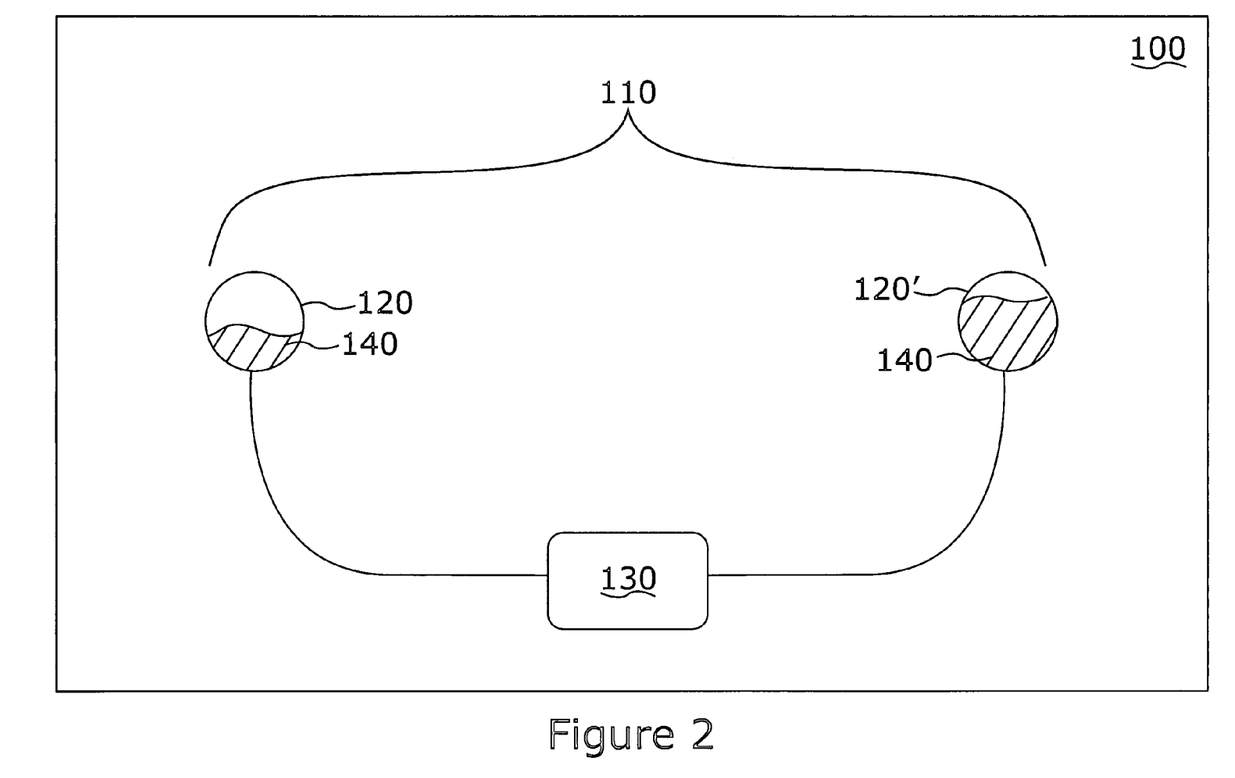
FIG. 2 is a top view of the mass transfer system mounted on the vehicle which is used to transfer mass such that the center of mass and the center of rotation of the vehicle is moved from a first torque platform to a second torque platform.

Referring now to FIG. 2, there is shown a top view of the mass transfer system 110 in accordance with the invention, mounted on the vehicle 100. The mass transfer system 110 consists of two fluid reservoirs 120, and 120', spaced apart and disposed at opposite ends of the vehicle 100, together with a pumping mechanism 130 for the transfer of fluid mass 140 between the two reservoirs 120 and 120'. Transferring the fluid mass 140 between the two reservoirs 120 and 120' will change the rotational center of mass for the entire vehicle 100.

Referring now to FIG. 3, a top view of the combined mechanism of the two torque platforms 10, 10', together with the fluid mass transfer system 110 integrated on the vehicle 100 is shown. Two platform motors 60, 60' are operationally connected to the periphery of the torque platforms 10 and 10', respectively, to provide the rotational force to rotate the torque platforms 10, 10' relative to the vehicle 100. In another embodiment (not shown), a single motor can be used in place of the two platform motors 60, 60' to provide the rotational force to rotate the torque platforms 10, 10'. The use of two platform motors 60, 60' provides symmetric forces on the bearings 50, 50' of the torque platforms 10, 10', respectively.

In the embodiment of the invention shown in FIG. 3, the second set of motors connected to the periphery of the second torque platform 10' is designated by the element number 60'. The fluid reservoirs 120, 120' are placed in position relative to the torque platforms 10, 10' and the vehicle 100 so that the transfer of fluid mass 140 to one of the reservoirs 120, 120' results in the change of the rotational center of mass of the entire vehicle 100 to the center of the nearest torque platforms 10, 10' and the central bearing 50, 50', respectively. As a result, the rotation of either torque platforms 10, 10' by the peripheral platform motors 60, 60' imparts rotational motion to the entire vehicle 100.

In the case of the alternate embodiment with a single torque platform, the fluid reservoirs 120, 120' are placed in position relative to the two alternate positions of the single torque platform and the vehicle 100 so that the transfer of fluid mass 140 to one of the reservoirs 120, 120' results in the change of the rotational center of mass of the entire vehicle to the center of the nearest alternate position of the torque platform and its central bearing. As a result, the rotation of the torque platform in either alternate position by the peripheral platform motors 60, 60' imparts rotational motion to the entire vehicle 100.

Figure 4A:
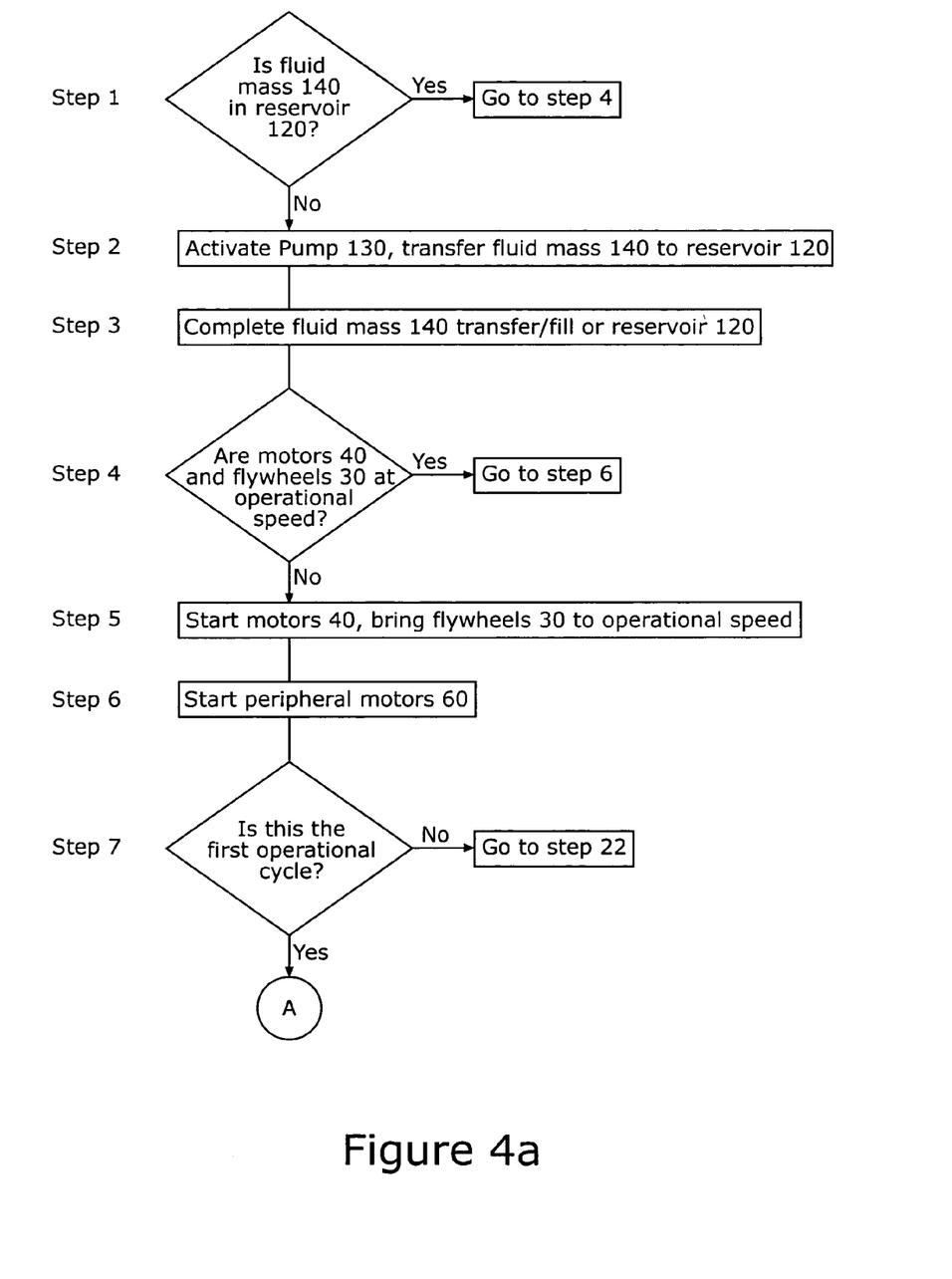
FIGS. 4a–4c are a schematic diagram of the control process whereby the motion of the torque platforms and their flywheels are integrated with the mass transfer system.
Figure 4B:
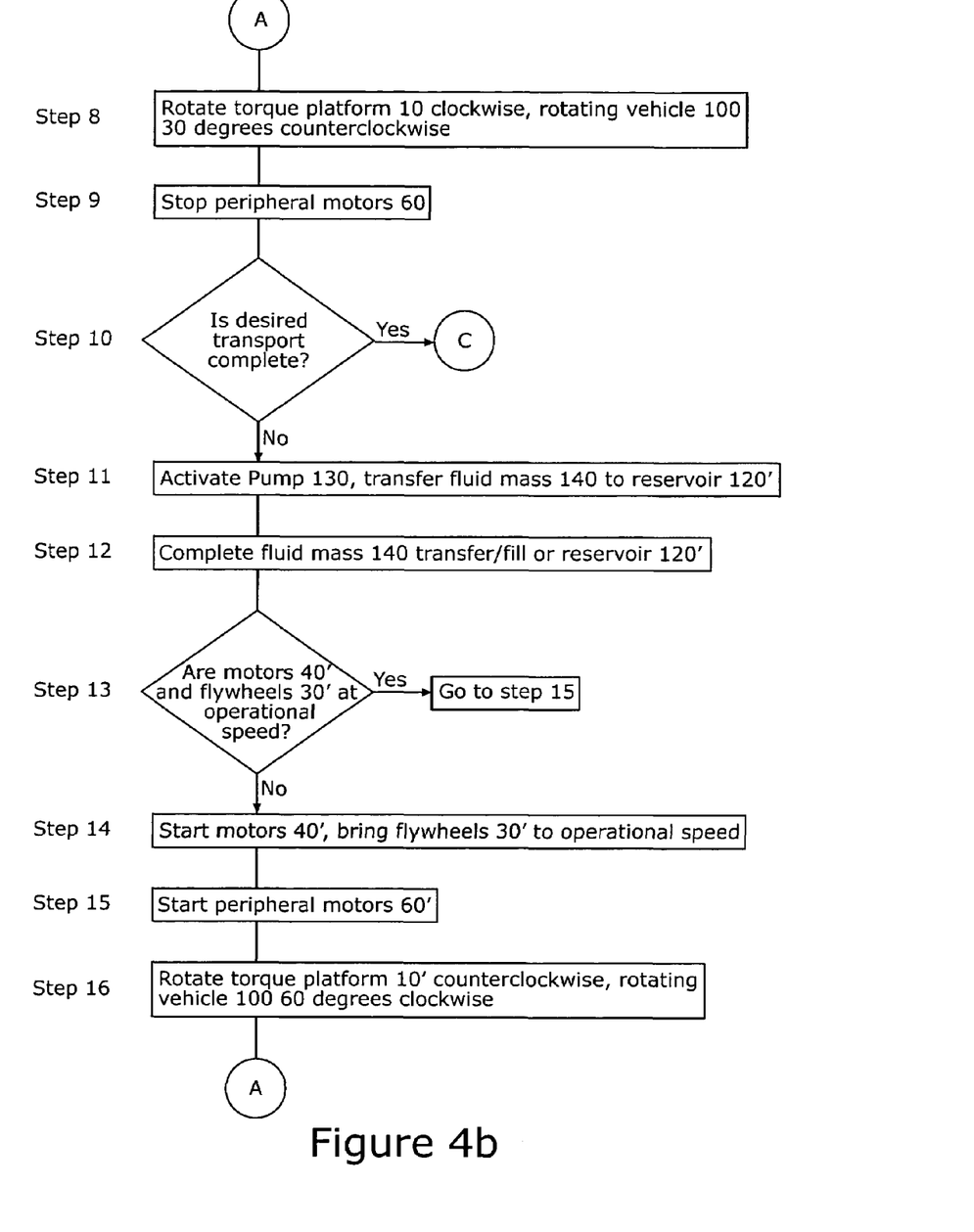
Figure 4C:
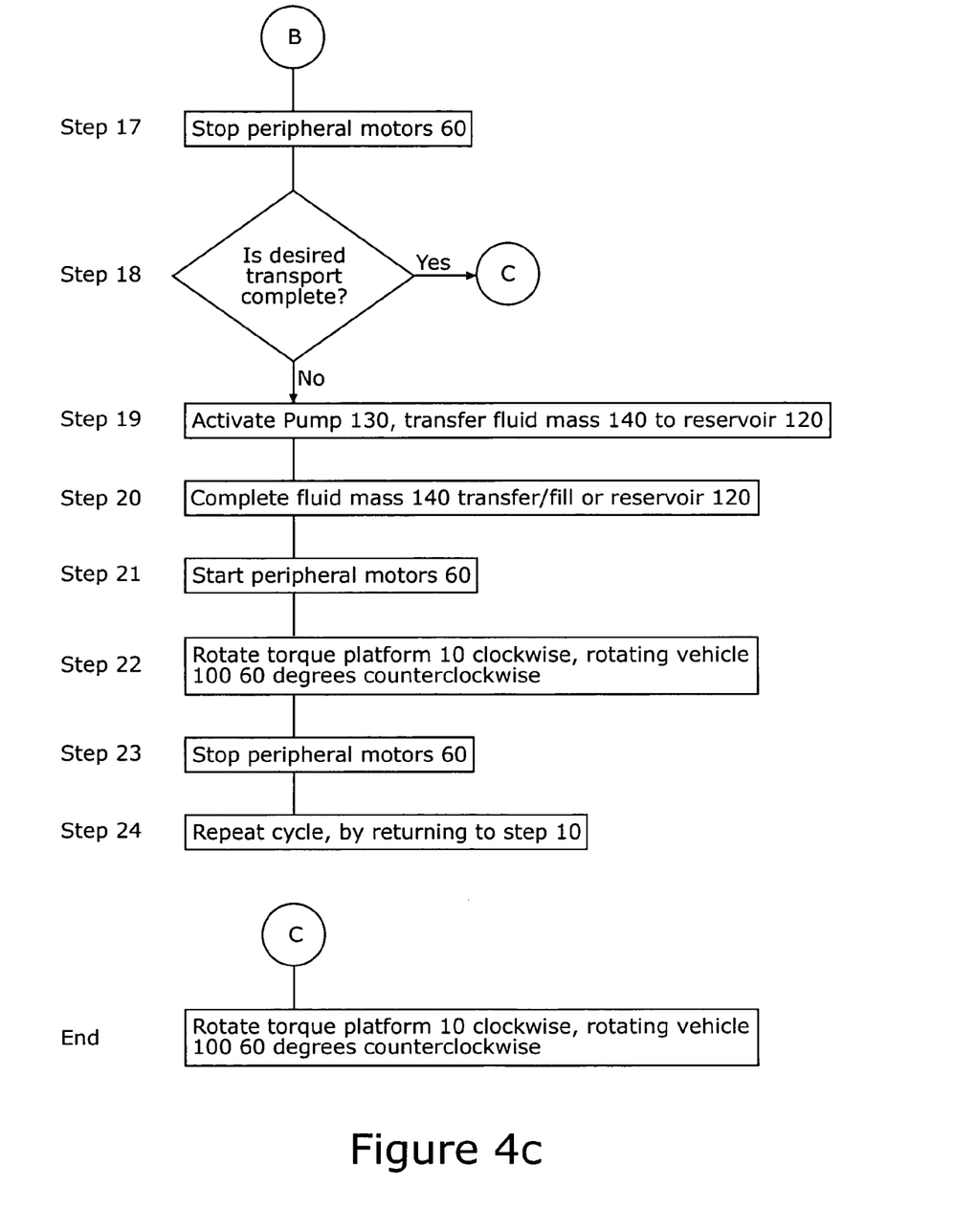

Referring now to FIGS. 4a–4c, there is shown a schematic diagram of the control process using a microprocessor control 160 operationally connected to the flywheel driving motors 40, 40', platform motors 60, 60', and the pump 130 to coordinate the successive alternate rotation of the torque platforms 10, 10' with the transfer of fluid mass and the change of location of the rotational center of mass of the vehicle 100. In operation, the first cycle of motion may be initiated by the transfer of fluid mass 140 to reservoir 120. A determination of the presence of fluid mass 140 in reservoir 120 is made in step 1, shown in the flowchart (FIG. 4a). If necessary, pump 130 is activated to transfer fluid mass 140 to reservoir 120, step 2, otherwise proceed to step 4.

When the reservoir 120 is completely filled, step 3, the rotational center of mass of the vehicle 100 is coincident with the central bearing 50 of the first torque platform 10. At this point, a determination of the rotational status of the motors 40 and flywheels 30 is made in step 4. If necessary, the microprocessor control 160 initiates the rotation of the two counter-rotating flywheels 30 by the two flywheel driving motors 40, step 5. Once the two flywheels 30 are up to their planned rotational speed, the two peripheral platform motors 60 are started, step 6, to rotate the torque platform 10 around the central bearing 50 in a clockwise direction. A determination is made as to whether this is the first operational cycle, in step 7. If this is the first operational cycle, the peripheral platform motors 60 are used to rotate the torque platform 10 clockwise, rotating the vehicle 100 30 degrees counterclockwise, step 8. Otherwise, if this is not the first operational cycle, the rotation is continued, to rotate the vehicle 100 60 degrees counterclockwise, step 22.

As a result of the resistance of the torque platform to rotation, caused by the forced change in the axes of rotation of the two counter-rotating flywheels 30 and the concomitant change in their angular momentum, the entire vehicle 100 is rotated in a counterclockwise direction. After the vehicle is rotated 30 degrees in a clockwise direction, step 8, the first cycle of motion is completed. Various degrees of rotation can be chosen, depending on the orientation of the vehicle 100 that is desired. The rotation of 30 degrees is used as an illustration of one possible first operational cycle.

At this point, the motors 60 are stopped, step 9, and the motors' 40 and flywheels' 30 rotation is continued to conserve the energy necessary to bring these to operational speed. A determination is made as to whether desired transport is complete, step 10. If further transport is desired, the pump 130 is used to transfer the fluid mass 140 to reservoir 120', step 11. When the second reservoir 120' is completely filled, step 12, a determination is made as to whether the second set of motors 40' and flywheels 30' are at operational speed, step 13. If the motors 40' and flywheels 30' are at operational speed, proceed to step 15. Otherwise the microprocessor control 160 initiates the rotation of the second set of two counter-rotating flywheels 30' by the two motors 40' mounted on the second torque platform 10', step 14, bringing the motors 40' and flywheels 30' up to operational speed.

Once the two flywheels are at their planned operational rotational speed, the two peripheral platform motors 60' are started, step 15, to rotate the torque platform 10' around the central bearing 50' in a counterclockwise direction, step 16. As a result of the resistance of the torque platform 10' to rotation caused by the forced change in the axes of rotation of the two counter-rotating flywheels 30' and the concomitant change in their angular momentum, the entire vehicle 100 is rotated 60 degrees in a clockwise direction. At this point, the motors 60' are stopped, step 17, and the motors' 40' and flywheels' 30' rotation is continued to conserve the energy necessary to bring these to operational speed.

A determination is made as to whether desired transport is complete, step 18. If further transport is desired, the pump 130 is used to transfer the fluid mass 140 to reservoir 120, step 19. Otherwise, proceed to the END.

After the fluid mass is completely transferred to the reservoir 120, step 20, the two peripheral platform motors 60 are started, to rotate the torque platform 10 clockwise, rotating the vehicle 100 60 degrees counterclockwise, step 22. When this rotation is complete, the two peripheral platform motors 60 are stopped, step 23. At this point, the operational cycles are continued as required to achieve the desired transport, by returning to step 10, as shown in step 24.

In the alternate embodiment with a single torque platform, the movement of the single torque platform from one alternate position to the other is similarly coordinated with the transfer of fluid mass 140 from reservoir 120 to reservoir 120', and with the rotation of the torque platform, achieves the resultant linear motion described above.

Figure 5:
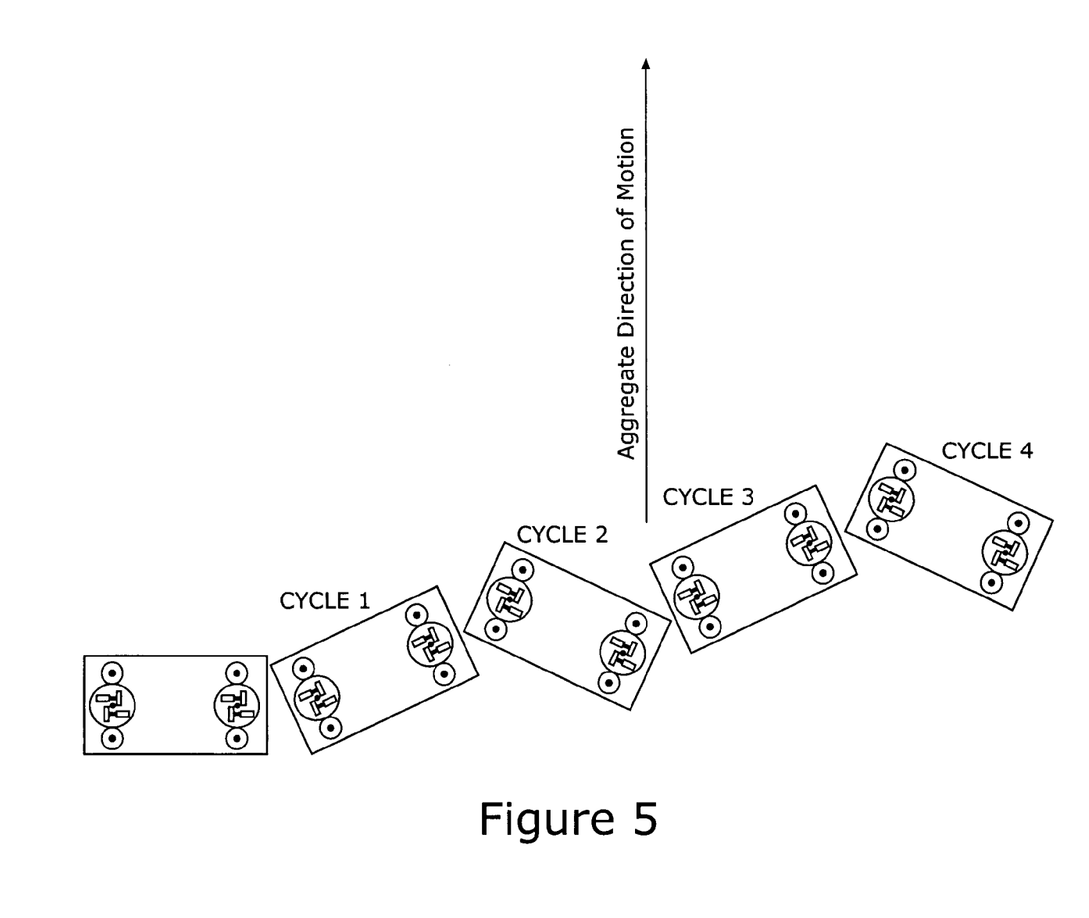
FIG. 5 is a diagram showing the motion of the vehicle through successive positions by the successive rotation of the individual torque platforms integrated with the mass transfer, resulting in the motion of the vehicle in the desired direction.

Referring now to FIG. 5, there is shown a diagram of the motion of the vehicle 100 in the positions resulting from successive rotations of the two torque platforms 10 and 10' integrated with the fluid mass transfer system 110 and the changed position of the rotational center of mass. Each successive increment of rotation results in a movement of the alternative extremity of the vehicle 100 in the desired direction of travel. For illustrative purposes, the initial amount of rotation is shown as 30 degrees, and the successive cycles are shown as 60 degrees of rotation. The successive increments around the changed rotational center of mass cancel out the overall rotation of the vehicle 100, and result in a resultant linear motion of the vehicle 100 in the desired direction. The degree of rotation selected is dependent on the exact motion of the vehicle that is desired, and the various amounts of rotation all fall within the scope of the present invention. For example, it is possible to rotate 180 degrees clockwise, followed by another 180 degree clockwise, successively as the rotational center of mass is changed, moving in the desired direction of travel in a manner of end over end. This alternative is not shown in FIGS. 4a–c, or in FIG. 5.

The invention described above can be used to move a vehicle in a linear direction, and also to adjust the attitude of a vehicle, by rotation of the vehicle, with minimal interaction with the immediate environment of the vehicle. A lighter-than-air ship, an ocean going surface ship, an attack/defense or research submarine, or a helicopter will be able to use this invention to rotate and change their attitude, and to provide linear motion, without expelling reaction mass, and without the disturbance caused by propellers, or screws rotating in the air or water. This will be of significant advantage when it is desirable in research situations, to minimize the disturbance of the environment, and flora and fauna in the vicinity of the vehicle, as well as allowing surreptitious travel not easily detected with conventional audio detection devices. It will also be advantageous when used to rotate a vehicle in a confined space, for instance when docking or maneuvering a vehicle.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of the invention.

Having thus described the invention, what is desired to be protected by Letters Patent is presented in the subsequently appended claims.

What is claimed is:

1. A mechanism for generating forces to transport a vehicle, comprising:
   a) at least one torque platform, movably connected to a vehicle;
   b) means for moving said torque platform from a first center of rotation of said vehicle to a second center of rotation of said vehicle;
   c) means for rotating said torque platform relative to said vehicle, about said first center of rotation of said vehicle, and for rotating said torque platform relative to said vehicle, about said second center of rotation of said vehicle; and
   d) means for coordinating said rotation of said torque platform about said first center of mass and about said second center of mass, resulting in a resultant substantially linear motion of said vehicle in a desired direction.

2. The mechanism in accordance with claim 1, further comprising two motors and counter-rotating flywheels operationally connected to said motors, respectively.

3. The mechanism in accordance with claim 2, wherein said means for rotating said torque platform relative to said vehicle comprises a motor.

4. The mechanism in accordance with claim 2, wherein said means for rotating said torque platform relative to said vehicle comprises two motors mounted symmetrically at the periphery of said torque platform.

5. The mechanism in accordance with claim 1, further comprising means for transferring mass from said first center of rotation of said vehicle to said second center of rotation of said vehicle.

6. The mechanism in accordance with claim 5, wherein said means for transferring mass comprises two fluid reservoirs operationally connected by a pump, said reservoirs filled with a fluid mass sized to result in the change of center of rotation of said vehicle from said first center of rotation of said vehicle to said second center of rotation of said vehicle.

7. A mechanism for generating forces to transport a vehicle, comprising:
   a) a first torque platform and a second torque platform, each of said torque platforms operationally connected to a vehicle, said first torque platform disposed near the distal end of said vehicle, and said second torque platform disposed near the proximal end of said vehicle;
   c) means for transferring mass from a first center of rotation of said vehicle, coincident with the center of rotation of said first torque platform, to a second center of rotation of said vehicle, coincident with the center of rotation of said second torque platform, said first and second centers of rotation being disposed near the distal and proximal ends of said vehicle, respectively;
   d) means for alternately rotating each of said torque platforms, rotating said first torque platform in a first rotational direction relative to said vehicle, about said first center of rotation of said vehicle, and rotating said second torque platform in a second rotational direction relative to said vehicle, about said second center of rotation of said vehicle, said second rotational direction being the opposite rotational direction to the first rotational direction; and
   e) means for coordinating said transfer of mass, rotation in said first rotational direction of said first torque platform about said first center of mass, and rotation in said second rotational direction of said second torque platform about said second center of mass, resulting in an integrated substantially linear motion of said vehicle in a desired direction.

8. The mechanism in accordance with claim 7, further comprising two sets of two counter-rotating flywheels operationally connected to two motors, one of said sets of two counter-rotating flywheels operationally connected to two motors disposed on said first torque platform and the second of said sets of two counter-rotating flywheels operationally connected to two motors disposed on said second torque platform.

9. The mechanism in accordance with claim 8, wherein said means for rotating said first torque platform relative to said vehicle and said second torque platform relative to said vehicle comprises in each case a motor.

10. The mechanism in accordance with claim 8, wherein said means for rotating said first torque platform relative to said vehicle and said second torque platform relative to said vehicle comprises in each case two motors mounted substantially symmetrically at the periphery of said first and said second torque platforms.

11. The mechanism in accordance with claim 10, wherein said means for transferring mass from a first center of rotation of said vehicle to a second center of rotation of said vehicle comprises a mass transfer system.

12. The mechanism in accordance with claim 11, wherein said mass transfer system comprises two fluid reservoirs operationally connected by a pump, said reservoirs filled with a substantial fluid mass sized to result in the change of center of rotation of said vehicle from said first center of rotation of said vehicle to said second center of rotation of said vehicle.

* * * * *